(12) United States Patent
Misawa

(10) Patent No.: US 7,974,019 B2
(45) Date of Patent: Jul. 5, 2011

(54) IMAGE CAPTURING DEVICE

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/517,307

(22) Filed: Sep. 8, 2006

(65) Prior Publication Data

US 2007/0058045 A1      Mar. 15, 2007

(30) Foreign Application Priority Data

Sep. 9, 2005   (JP) ................................ 2005-262492

(51) Int. Cl.
*G02B 7/02* (2006.01)
(52) U.S. Cl. ........................................ 359/811; 359/826
(58) Field of Classification Search ............. 348/207.99, 348/335, 552; 359/811, 676, 694, 821, 822–826, 359/817, 819, 831, 833, 837; 396/429, 529, 396/535
See application file for complete search history.

(56) References Cited

U.S. PATENT DOCUMENTS

| | | | |
|---|---|---|---|
| 4,114,171 A * | 9/1978 | Altman ........................ | 396/351 |
| 6,259,863 B1 * | 7/2001 | Maruyama .................... | 396/177 |
| 7,170,558 B2 * | 1/2007 | Yokota et al. ................. | 348/337 |
| 7,321,470 B2 * | 1/2008 | Matsumoto et al. .......... | 359/694 |
| 2002/0033895 A1 * | 3/2002 | Toji et al. ................ | 348/333.01 |
| 2002/0168190 A1 * | 11/2002 | Shintani ...................... | 396/448 |
| 2004/0109076 A1 | 6/2004 | Yokota et al. | |
| 2004/0169764 A1 * | 9/2004 | Ishii et al. .................... | 348/340 |
| 2004/0169772 A1 * | 9/2004 | Matsui et al. ................ | 348/375 |
| 2005/0212946 A1 * | 9/2005 | Mikami ........................ | 348/335 |
| 2006/0114583 A1 * | 6/2006 | Miki ............................. | 359/824 |
| 2006/0193617 A1 * | 8/2006 | Oya ............................... | 396/72 |
| 2007/0091200 A1 * | 4/2007 | Yamaguchi et al. .......... | 348/345 |

FOREIGN PATENT DOCUMENTS

| | | |
|---|---|---|
| DE | 2659729 A1 | 10/1977 |
| EP | 0933668 A2 | 8/1999 |
| JP | 10-253886 A | 9/1998 |
| JP | 2002185825 A | 6/2002 |
| JP | 2004-251936 A | 9/2004 |
| JP | 2004-325471 A | 11/2004 |
| JP | 2005-45293 A | 2/2005 |
| JP | 2005037548 A | 2/2005 |

OTHER PUBLICATIONS

Japanese Office Action Dated Jun. 16, 2010.

* cited by examiner

*Primary Examiner* — Ricky L Mack
*Assistant Examiner* — Mahidere S Sahle
(74) *Attorney, Agent, or Firm* — Sughrue Mion, PLLC

(57) ABSTRACT

The image capturing device according to the present invention is configured so that only the lens barrel having the entrance window and the refractive optical system can be expanded and contracted. Therefore, the structure can be simplified. In addition, the entrance window is located at the in-use position where the entrance window protrudes from the image capturing device body when the lens barrel is expanded, and is located at the not-in-use position where the entrance window is housed in the image capturing device body when the lens barrel is contracted. Therefore, the size of the camera can be reduced. Furthermore, when the image capturing device is not in use, the entrance window is housed in the image capturing device body. Therefore, any barrier is not needed, and the structure can be simplified.

19 Claims, 13 Drawing Sheets

IMAGE CAPTURING DEVICE

BACKGROUND OF THE INVENTION

1. Field of the Invention

The present invention relates to an image capturing device. In particular, it relates to an image capturing device, such as a digital camera, that incorporates a refractive optical system.

2. Description of the Related Art

Japanese Patent Application Laid-Open No. 2004-251936 discloses a thin digital camera that incorporates a refractive optical system. This digital camera has an objective lens that receives subject light on the front of the camera body and a refractive optical system that bends the subject light incident through the objective lens 90 degrees downward to form the subject image on an imaging element. In addition, the body of the camera disclosed in Japanese Patent Application Laid-Open No. 2004-251936 has an opening to expose the objective lens and a barrier to close the opening, and the barrier is moved to close the opening in response to an instruction to stop the operation of the camera. Thus, the objective lens is protected by the barrier when the camera is not in use.

On the other hand, a digital camera disclosed in Japanese Patent Application Laid-Open No. 2004-325471 has a nested camera body and a nested lens barrel of a refractive optical system that expands in the same direction as the camera body. This digital camera is configured so that the lens barrel is expanded and contracted in association with expansion and contraction of the camera body. Expansion of the camera body causes expansion of the lens barrel, thereby exposing an entrance window of the lens barrel. Contraction of the camera body causes contraction of the lens barrel, thereby closing the entrance window with a barrier.

SUMMARY OF THE INVENTION

However, in the digital camera disclosed in Japanese Patent Application Laid-Open No. 2004-251936, the entire optical system including the refractive optical system is housed in the camera body even when the camera is in use. Therefore, the total height of the camera body is defined by the total length of the optical system. As a result, the digital camera has a disadvantage that the total height of the camera body is large, and the size of the camera itself is also large. In addition, the digital camera according to Japanese Patent Application Laid-Open No. 2004-251936 has a barrier to protect the front surface of the objective lens. Therefore, the digital camera has a problem that it requires an open/close mechanism to move the barrier forward and backward with respect to the opening, so that the structure is complicated.

On the other hand, the digital camera described in Japanese Patent Application Laid-Open No. 2004-325471 has a problem that it has a special configuration in which both the camera body and the lens barrel have a nested structure, so that the mechanism is complicated, and manufacture thereof is difficult.

The present invention has been devised in view of such circumstances, and an object thereof is to provide an image capturing device that has a refractive optical system that allows size reduction of the camera body with a simple configuration.

In order to attain the object described above, according to a first aspect of the present invention, there is provided an image capturing device, comprising: an image capturing device body; and a lens barrel having an entrance window and a refractive optical system that bends subject light incident from the entrance window to form an image thereof on an imaging element, the lens barrel being housed in the image capturing device body in such a manner that the lens barrel is capable of protruding from and retracted into the image capturing device body, in which the lens barrel is capable of being expanded and contracted along an optical axis bent and extending toward the imaging element, the entrance window is located at an in-use position where the entrance window protrudes from the image capturing device body when the lens barrel is expanded, and the entrance window is located at a not-in-use position where the entrance window is housed in the image capturing device body when the lens barrel is contracted.

According to the first aspect, only the lens barrel having the entrance window and the refractive optical system can be expanded and contracted, and the image capturing device body cannot be expanded and contracted. Thus, compared with the digital camera described in Japanese Patent Application Laid-Open No. 2004-325471, in which both the image capturing device body and the lens barrel can be expanded and contracted, the structure can be simplified. In addition, the entrance window is located at the in-use position where the entrance window protrudes from the upper surface of the image capturing device body when the lens barrel is expanded, and is located at the not-in-use position where the entrance window is housed in the image capturing device body when the lens barrel is contracted. Thus, compared with the digital camera described in Japanese Patent Application Laid-Open No. 2004-251936, in which the entire optical system is housed in the camera body even when the camera is in use, the total height of the camera body can be reduced, so that the size of the camera can be reduced. Furthermore, since the entrance window is housed in the image capturing device body when the camera is not in use, any barrier is not needed. Thus, compared with the digital camera having a barrier described in Japanese Patent Application Laid-Open No. 2004-251936, the structure can be simplified because the barrier open/close mechanism is not needed.

According to a second aspect of the present invention, in the first aspect, the entrance window protrudes outward from an upper surface or side surface of the image capturing device body.

According to the second aspect, if the entrance window protrudes outward from the upper surface of the image capturing device body, the total height of the camera can be reduced. Alternatively, if the entrance window protrudes outward from the side surface of the image capturing device body, the total width (horizontal dimension) of the camera can be reduced.

According to a third aspect of the present invention, in the first or second aspect, when the lens barrel is expanded, a zoom lens disposed in the lens barrel moves along the optical axis to change the focal length.

According to the third aspect, when the entrance window is located at the in-use position and protrudes outward from the image capturing device body, the zoom lens can be moved along the optical axis by changing the degree of expansion of the lens barrel. Thus, the focal length can be changed and set at a desired value.

According to a fourth aspect of the present invention, in the first, second or third aspect, the entrance window has an integrally formed optical finder, and the optical finder is moved along with the entrance window between the in-use position and the not-in-use position.

According to the fourth aspect, since the optical finder is housed in the image capturing device body along with the entrance window when the image capturing device is not in use, the optical finder can also be protected.

According to a fifth aspect of the present invention, in the first, second, third or fourth aspect, the entrance window has an integrally formed stroboscopic light-emitting part, and the stroboscopic light-emitting part is moved along with the entrance window between the in-use position and the not-in-use position.

According to the fifth aspect, since the stroboscopic light-emitting part is also housed in the image capturing device body along with the entrance window and the optical finder when the image capturing device is not in use, the stroboscopic light-emitting part can also be protected. In addition, when the image capturing device according to the fifth aspect is not in use, the entrance window, the optical finder and the stroboscopic light-emitting part, which are components responsible for the imaging capability, are all housed in the image capturing device body. Therefore, viewed from outside, the image capturing device has a capsule-like shape. Thus, any case for protecting the entrance window, the optical finder and the stroboscopic light-emitting part during carriage is not needed.

The image capturing device according to the present invention is configured so that only the lens barrel having the entrance window and the refractive optical system can be expanded and contracted. Therefore, the structure can be simplified. In addition, the entrance window is located at the in-use position where the entrance window protrudes from the image capturing device body when the lens barrel is expanded, and is located at the not-in-use position where the entrance window is housed in the image capturing device body when the lens barrel is contracted. Therefore, the size of the camera can be reduced. Furthermore, when the image capturing device is not in use, the entrance window is housed in the image capturing device body. Therefore, any barrier is not needed, and the structure can be simplified.

DETAILED DESCRIPTION OF THE PREFERRED EMBODIMENTS

In the following, preferred embodiments of an image capturing device according to the present invention will be described with reference to the accompanying drawings.

The image capturing device according to the present invention described below is a digital camera 10 having a refractive optical system. However, the present invention is not limited thereto and can be equally applied to a camera-equipped cellular phone.

Figure 1:
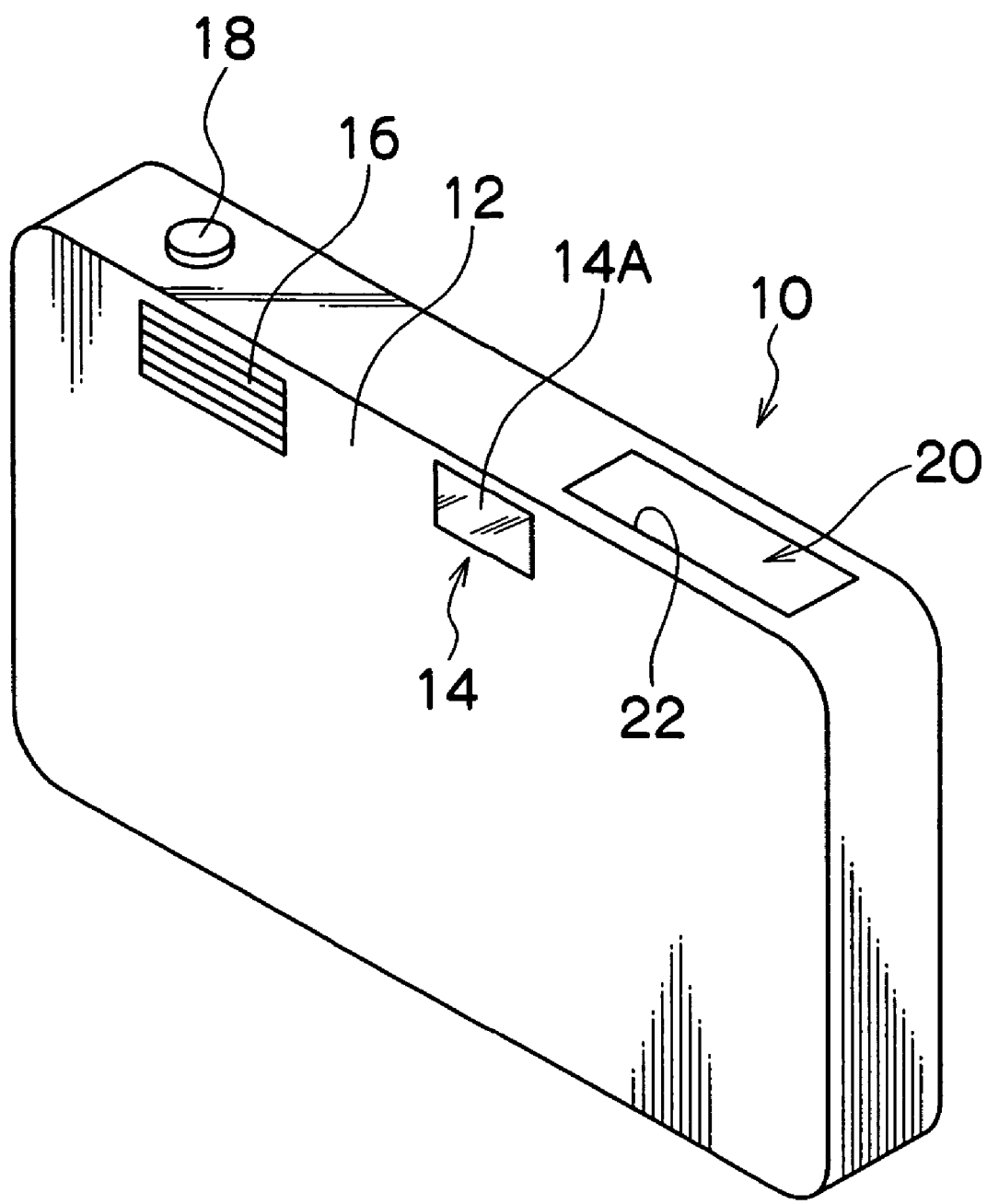
FIG. 1 is a front perspective view of a digital camera according to an embodiment.
Figure 2:
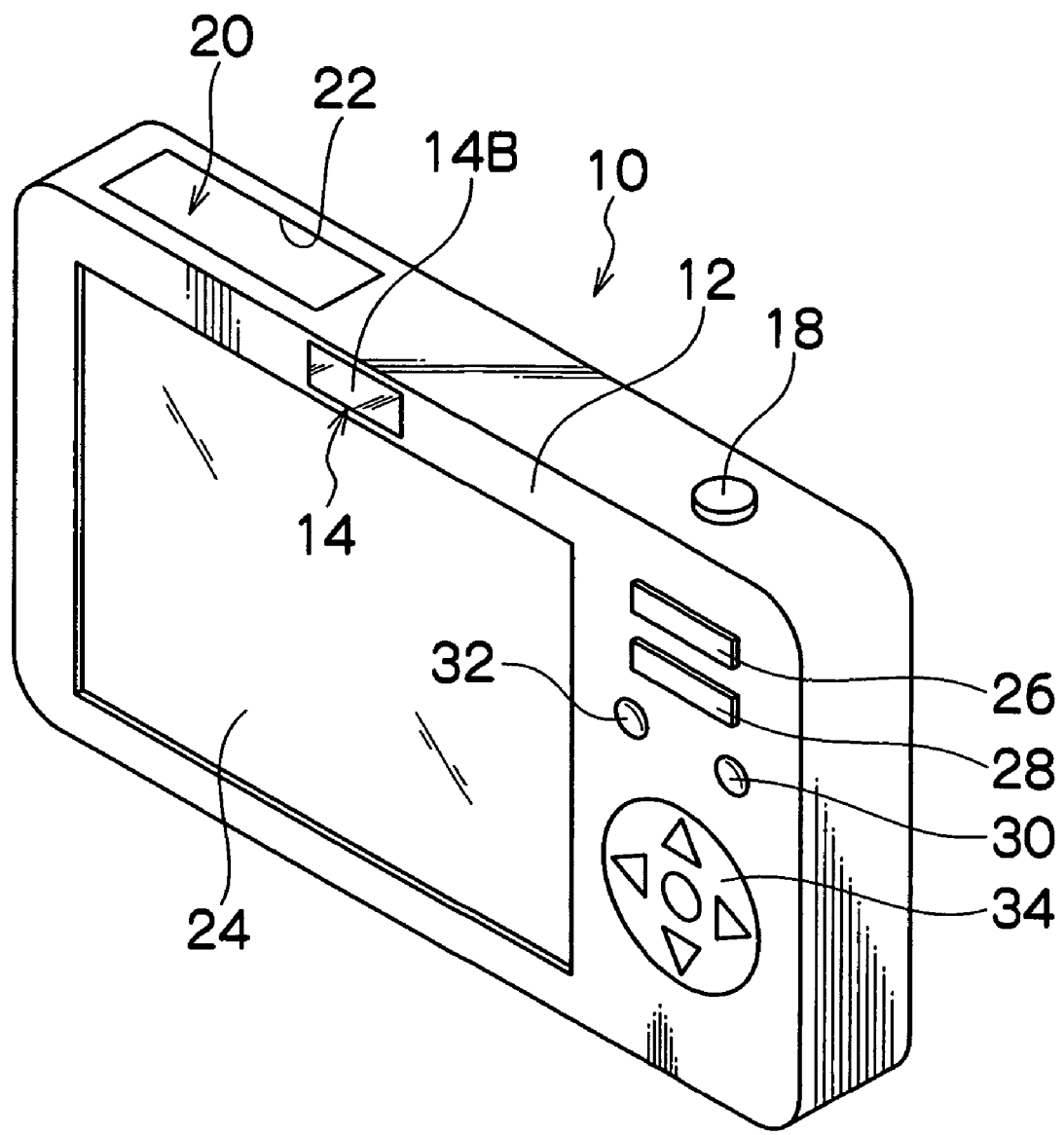
FIG. 2 is a rear perspective view of the digital camera shown in FIG. 1.
Figure 3:
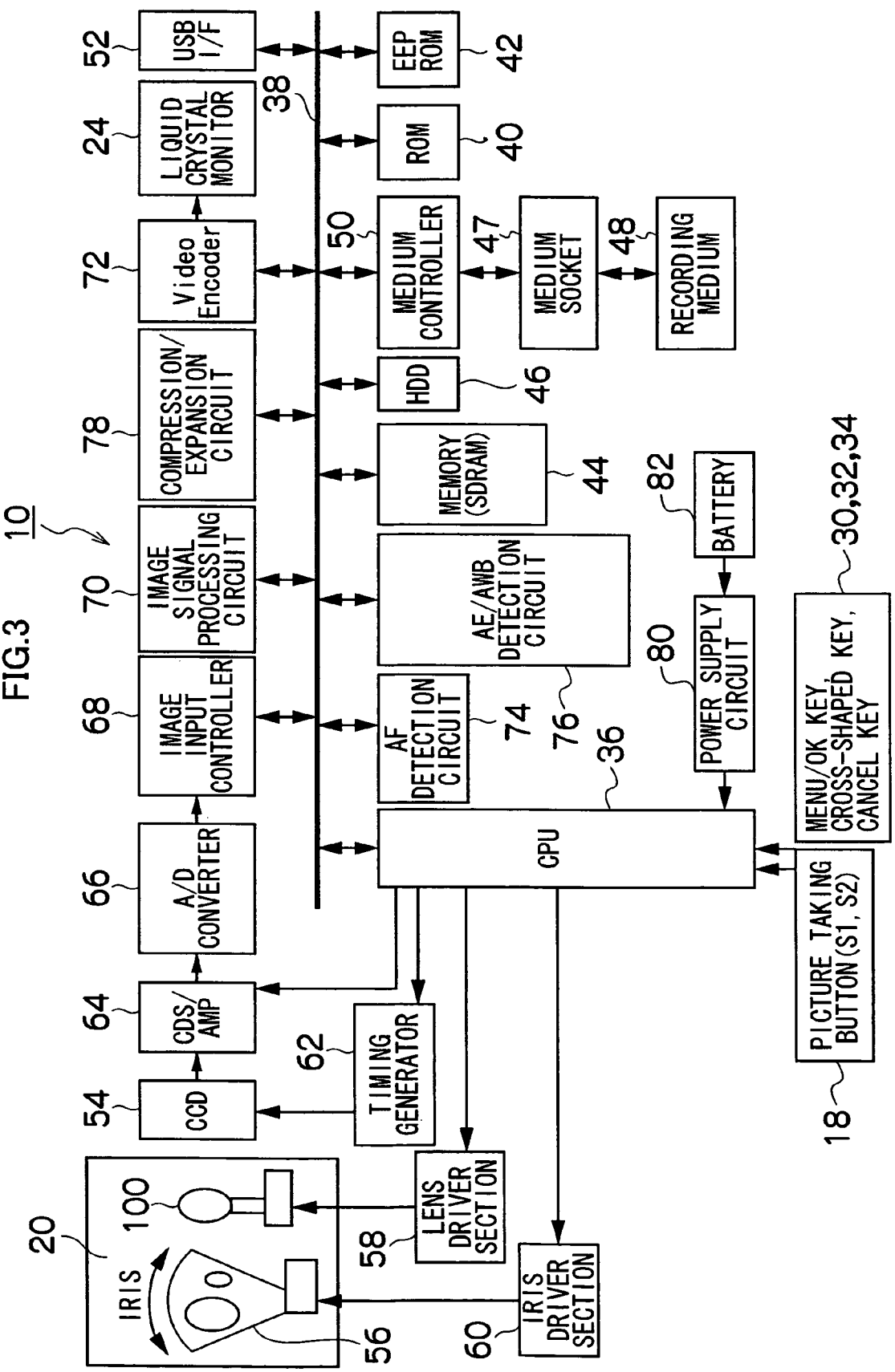
FIG. 3 is a block diagram illustrating a configuration of the digital camera shown in FIG. 1.

FIG. 1 is a front perspective view of a digital camera 10 according to an embodiment of the present invention, and FIG. 2 is a rear perspective view of the digital camera 10. FIG. 3 is a block diagram illustrating the entire configuration of the digital camera 10.

As shown in FIGS. 1 and 2, the digital camera 10 has a camera case (an image capturing device main body) 12, and the camera case 12 viewed from outside has the shape of a flat rectangular parallelepiped that has a small depth and has a width greater than the height. The camera case 12 houses a refractive optical system and an imaging element.

As shown in FIG. 1, an objective window 14A of an optical finder 14 and a stroboscopic light-emitting part 16 having a xenon tube are disposed in an upper area of a front surface of the camera case 12, and a picture taking button 18 is disposed on an upper surface of the camera case 12. The picture taking button 18 is manipulated (half pressed or fully pressed) by the forefinger of the right hand of a user holding the camera case 12. When the picture taking button 18 is half pressed, the focus a subject image is adjusted. Then, when the button 18 is fully pressed, the subject image is formed on the imaging element through the refractive optical system described later. In addition, a rectangular opening 22 through which a lens barrel 20 holing the refractive optical system protrudes and is retracted is formed in the upper surface of the camera case 12.

On the other hand, as shown in FIG. 2, on the rear surface of the camera case 12, a liquid crystal monitor 24, a power supply switch 26, a mode selection switch 28, a menu/OK key 30, a cancel key 32, a cross-shaped key 34, and an ocular window 14B of the optical finder 14 are disposed at their respective predetermined positions. The power supply switch 26 is manipulated to input an instruction to start or stop the operation of the whole digital camera 10, that is, an instruction to start or stop the supply of electric power from a power supply. The mode selection switch 28 is a switch to select one of a camera mode for taking a still image, a motion-picture mode for taking a motion picture, and a replay mode for reproducing and displaying an image recorded in a recording medium. The liquid crystal monitor 24 displays an image according to the selected mode. The menu/OK key 30 is an operation key that doubles as a menu button to input an instruction to display a menu on the screen of the liquid crystal monitor 24 and as an OK button to confirm the selection and input an instruction to execute the selected operation. The cancel key 32 is used to delete a desired object, such as a selected item, and cancel any previous instruction or to restore the manipulation to the immediately preceding state. The cross-shaped key 34 can be inclined in four directions, that is, from side to side and up and down and is used as an operation key to select various setting items in mode setting or the like, modify a setting and erase a recorded image and as an operation key to adjust the zoom ratio and input an instruction for frame-advance/frame-reverse reproduction.

As shown in FIG. 3, the entire operation of the digital camera 10 is controlled by a central processing unit (CPU) 36 in a centralized manner. The CPU 36 serves not only as a control device for controlling the camera system according to a predetermined program but also as a calculation device for performing various calculations including an automatic exposure (AE) calculation, an automatic focusing (AF) calculation and a white balance (WB) adjustment calculation.

An ROM 40 is connected to the CPU 36 via a bus 38, and the ROM 40 stores a program executed by the CPU 36, various kinds of data required for control and the like. An EEPROM 42 stores information about a CCD pixel defect, various constants/information concerning the operation of the camera and the like.

A memory (SDRAM) 44 is used not only as a program development area and a work area for calculations by the CPU 36 but also as a temporary storage area for image data and sound data. A recording section (HDD) 46 is a temporary storage memory dedicated for image data, and the content in the recording section 46 can be erased through manipulation of the cross-shaped key 34 of the digital camera 10.

The picture taking button 18 is an operation button to input an instruction to start picture taking and is composed of a two-stroke switch comprising an S1 switch, which is turned on when the button is half pressed, and an S2 switch, which is turned on when the button is fully pressed.

The liquid crystal monitor 24 is used also as a user-interface display screen and displays menu information and information about selected items, settings and the like, as required. In addition, the liquid crystal monitor 24 provides a thumbnail view of images recorded in the recording section 46. Instead of the liquid crystal monitor 24, an organic EL or other display device may be used.

The digital camera 10 has a medium socket 47, and a recording medium 38 is attached to the medium socket 47. The recording medium is not limited to a particular type, and various media, such as a semiconductor memory card typified by SmartMedia (trademark), a portable small hard disk, a magnetic disk, an optical disk and magneto-optical disk, may be used.

A medium controller 50 performs a signal conversion required for delivery of input and output signals suitable for the recording medium 48 attached to the medium socket 47.

In addition, the digital camera 10 has an USB interface section 52 as a communication device to connect to an external device, such as a personal computer. A connector serving as a communication terminal is connected to the USB interface section 52, and the external device is connected to the connector via an USB cable (not shown). Then, data such as image data can be delivered between the digital camera 10 and the external device. Of course, the communication scheme is not limited to the USB, and other communication schemes may be used.

Now, a picture taking function of the digital camera 10 will be described.

When a camera mode or motion-picture mode is selected by the mode selection switch 28, power is supplied to an imaging section including a color CCD solid-state imaging element (referred to as CCD hereinafter) 54, and the digital camera becomes able to take pictures.

The lens barrel 20 is an optical unit including a group of taking lenses 100 constituting a refractive optical system and an iris/mechanical shutter 56. The lens barrel 20 is electrically driven by a lens driver section 58 and an iris driver section 60 under the control of the CPU 36 to achieve zooming, focusing and iris control.

Light having passed through the group of taking lenses 100 is focused on a light-receiving surface of the CCD 54. The light-receiving surface of the CCD 54 has a two-dimensional array of multiple photodiodes (light-receiving elements), and primary-color filters of red (R), green (G) and blue (B) associated with the respective photodiodes are disposed in a predetermined arrangement. In addition, the CCD 54 has an electronic shutter capability to control the charge storage time (shutter speed) of each photodiode. The control of the charge storage time at the CCD 54 is achieved by the CPU 36 via a timing generator 62. Instead of the CCD 54, a MOS-type or other imaging element may be used.

Each photodiode converts the subject image formed on the light-receiving surface of the CCD 54 into an amount of signal charge, which is determined by the amount of incident light. The signal charges stored in the respective photodiodes are sequentially read out as voltage signals (image signals) corresponding to the signal charges in accordance with a driving pulse supplied from the timing generator 62 in response to an instruction from the CPU 36.

The signals output from the CCD 54 are transmitted to an analog processing section (CDS/AMP) 64, in which the R, G and B signals for each pixel are sampled and held (or subjected to a correlated double sampling processing) and amplified, and then passed to an A/D converter 66. The dot-sequential R, G, and B signals converted into digital signals by the A/D converter 66 are stored in the memory 44 via an image input controller 68.

An image signal processing circuit 70 processes the R, G and B signals stored in the memory 44 under an instruction from the CPU 36. That is, the image signal processing section 70 functions as an image processing device comprising a synchronizing circuit (a processing circuit that converts color signals in a synchronized manner by interpolating a spatial displacement among the color signals due to the arrangement of color filters of the single-panel CCD), a white balance correction circuit, a gamma correction circuit, a contour correction circuit, a luminance/color-difference signal generator circuit and the like, and performs a predetermined signal processing using the memory 44 in accordance with a command from the CPU 36.

The RGB image data input to the image signal processing circuit 70 is converted into a luminance signal and a color-difference signal by the image signal processing circuit 70 and subjected to a predetermined processing, such as gamma correction. The image data processed by the image signal processing circuit 70 is recorded in the recording section 46.

In the case where the taken image is output to the liquid crystal monitor 24 for monitoring, the image data is read from the data recording section 46 and transmitted to a vide encoder 72 via the bus 38. The video encoder 72 converts the input image data into a signal of a predetermined format for display (an NTSC color composite video signal, for example) and outputs the signal to the liquid crystal monitor 24.

When the picture taking button 18 is half pressed, and the S1 switch is turned on, the digital camera 10 starts the AE and AF processings. That is, the image signal output from the CCD 54 is A/D-converted and then input to an AF detection circuit 74 and an AE/AWB detection circuit 76 via the image input controller 68.

The AE/AWB detection circuit 76 has a circuit that divides one screen into a plurality of areas (16 by 16 areas, for example) and integrates the RGB signals for each divisional area and supplies the resulting integrated values to the CPU 36. Based on the integrated values received from the AE/AWB detection circuit 76, the CPU 36 determines the luminance of the subject (subject luminance) and calculates an appropriate exposure value for picture taking (a picture taking EV). Based on the calculated exposure value and a predetermined program diagram, the iris value and the shutter speed are determined. And based on these, the CPU 36 controls the electronic shutter and the iris of the CCD 54 to achieve appropriate exposure.

For automatic white balance adjustment, the AE/AWB detection circuit 76 calculates an average integrated value of the RGB signals for each color for each divisional area and supplies the calculation result to the CPU 36. From the received integrated values for R, G and B, the CPU 36 determines the ratios R/G and B/G for each divisional area. Then, based on the distribution of the values R/G and B/G in an R/G and B/G color space or the like, the type of the light source is determined. Then, based on a white balance adjustment value suitable for the determined light source type, gain values (white balance correction values) for the R, G and B signals in the white balance adjustment circuit are controlled so that the value of each ratio is approximately 1, for example. And then, the signal for each color channel is corrected. If the gain values in the white balance adjustment circuit are adjusted so that each ratio becomes a value other than 1, a certain hue can be imparted to the produced image.

For the AF control in the digital camera 10, contrast AF is used which involves moving a focusing lens (a movable lens in the lens optical system constituted by the group of taking lenses 100 that contributes to focus adjustment) to maximizes the high-frequency component of the G signal of the vide signal, for example. That is, the AF detection circuit 74 comprises a high-pass filter that allows only the high-frequency component of the G signal to pass therethrough, an absolute-value generating section, an AF area extracting section that extracts signals in a focus-target area previously set in the screen (at the center of the screen, for example), and an integrator section that integrates the absolute-value data in the AF area.

The CPU 36 is informed of the integrated value data obtained by the AF detection circuit 74. The CPU 36 calculates focus evaluation values at a plurality of AF detection points by moving the focusing lens by controlling the lens driver section 58 and designates a lens position where the maximum evaluation value is obtained as a focus position. Then, the CPU 36 controls the lens driver section 58 to move the focusing lens to the determined focus position. Here, instead of the G signal, a luminance signal (Y signal) may be used for calculation of the AF evaluation value.

When the picture taking button 18 is half pressed, the S1 switch is turned on, and the AE and /AF processings are performed. Then, when the picture taking button 18 is fully pressed, the S2 switch is turned on, and the picture taking operation for recording is started. Image data obtained in response to the turn on of the S2 switch is converted into a luminance/color-difference signal (Y/C signal) by the image signal processing section 70, subjected to a predetermined processing, such as gamma correction, and then stored in the memory 44.

The Y/C signal stored in the memory 44 is compressed in a predetermined format by a compression/expansion circuit 78, and then recorded in the recording medium 48 via the medium controller 50. For example, a still image is recorded in the JPEG format.

When the replay mode is selected by the mode selection switch 28, compressed data of the last image file (the most recent recorded file) recorded in the recording medium 48 is read. If the last recorded file is a still image file, the read compressed image data is expanded into a non-compressed YC signal by the compression/expansion circuit 78, the non-compressed YC signal is converted into a signal for display by the image signal processing circuit 70 and the video encoder 72, and the signal for display is output to the liquid crystal monitor 24. In this way, the image, which is the content of the file, is displayed on the screen of the liquid crystal monitor 24.

During replay of one frame of still image (including the time during which a leading frame of a motion picture is replayed), if a right or left key of the cross-shaped key 34 is manipulated, the file replayed can be changed (frame can be advanced forward or reversed backward). Then, the image file corresponding to the frame advanced forward or reversed backward is read from the recording medium 48, and the still image or motion picture is replayed and displayed on the liquid crystal monitor 24 in the same manner as described above. The digital camera 10 is driven by electric power supplied from a battery 82 via a power supply circuit 80.

Furthermore, the digital camera 10 has a connector (not shown) for charging the battery 82, which is a secondary battery, on the bottom surface of the camera case 12. Furthermore, on the bottom surface of the camera case 12, there is provided a connector (not shown) to transmit image data stored in the recording section 46 to another device. The whole configuration of the camera 10 is as described above.

Figure 4:
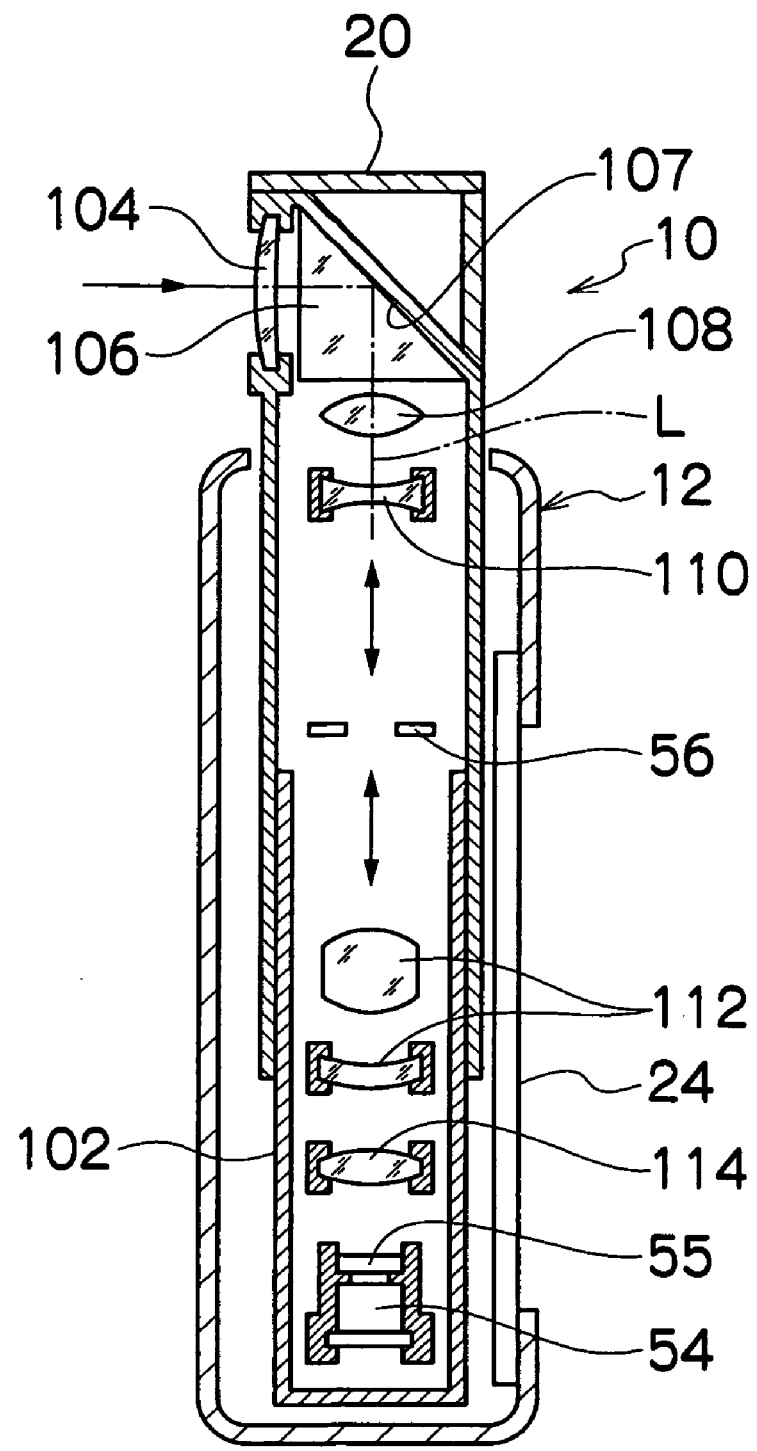
FIG. 4 is a vertical cross-sectional view of an optical system when the digital camera shown in FIG. 1 is in use.
Figure 5:
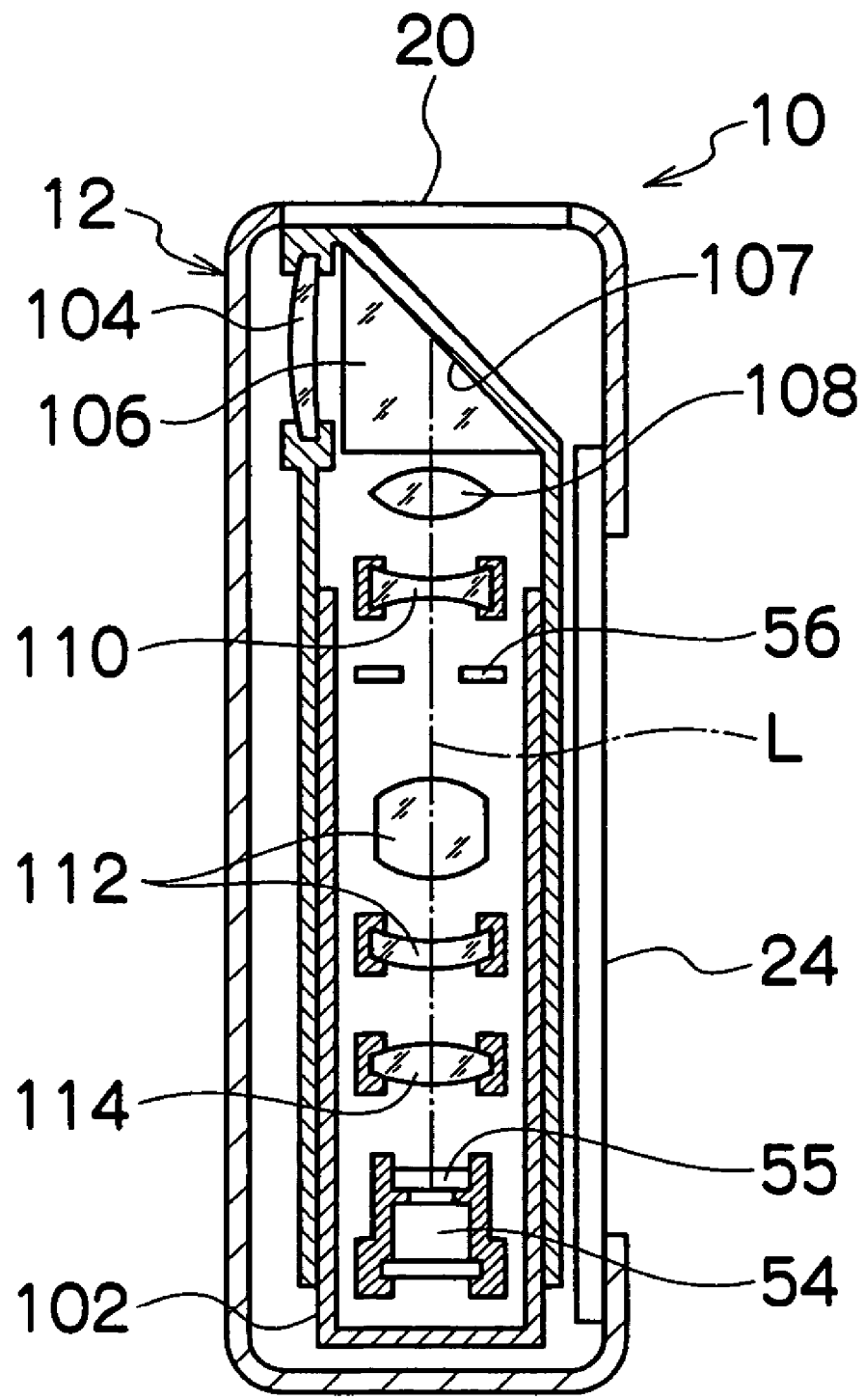
FIG. 5 is a vertical cross-sectional view of an optical system when the digital camera shown in FIG. 1 is not in use.

FIGS. 4 and 5 are cross-sectional views showing arrangements of the group of taking lenses 100 of the digital camera 10. FIG. 4 is a cross-sectional view showing the nested lens barrel 20 expanded upward with respect to a fixed lens barrel 102 and the entrance window 104 is located at an in-use position where the entrance window 104 protrudes outward from the upper surface of the camera case 12. FIG. 5 is a cross-sectional view showing the lens barrel 20 contracted downward with respect to the fixed lens barrel 102 and the entrance window 104 is located at a not-in-use position where the entrance window 104 is completely housed in the camera case 12. The entrance window 104 may be a transparent plate that simply transmits light or a lens.

The group of taking lenses 100 shown in these drawings constitute a picture taking optical system that guides light from a subject to the CCD 54 and focuses the light thereon. The picture taking optical system comprises the entrance window 104 for entrance of light from a subject, a refractive optical system 106 that bends the path of the incident light from the entrance window 104 substantially perpendicularly, a front lens element 108, lenses 110 and 112 of a zoom optical system, the iris/mechanical shutter 56, and a relay lens 114. The refractive optical system 106 is disposed to face the entrance window 104 and bend the path of the incident light from the entrance window 104 downward 90 degrees. As the refractive optical system 106, a right-angle prism whose inclined plane is a reflection plane 107 is used in this example. However, the refractive optical system 106 is not limited to the right-angle prism but may be any other optical element that can bend the light path, such as a simple mirror. Reference numeral 55 designates a cover glass that protects the imaging surface of the CCD 54.

The lenses 110 and 112 of the zoom optical system are disposed between the refractive optical system 106 and the CCD 54 in such a manner that the optical axis L thereof passes through the center of the reflection plane 107 of the refractive optical system 106, forms an angle of 45 degrees with the reflection plane 107, passes through the center of the CCD 54, and is perpendicular to the imaging surface of the CCD 54.

The lens barrel 20 is expanded and contracted along the optical axis L of the lenses 110 and 112 of the zoom optical system.

The lenses 110 and 112 of the zoom optical system include a group of zoom lens elements 110 for changing magnification and a group of focus lens elements 112 for focus adjustment. In the in-use position shown in FIG. 4, the group of zoom lens elements 110 mounted in the lens barrel 20 is moved away from the group of focus lens elements 112 for focus adjustment mounted in the fixed lens barrel 102 so that it is located at a position where a predetermined magnification (a three times optical zoom, for example) is achieved. FIGS. 4 and 5 show no zoom mechanism that moves the lenses 110 and 112 of the zoom optical system along the optical axis L to adjust the focal length. However, actually, in the in-use position shown in FIG. 4, a desired focal length can be achieved by a zoom mechanism moving the lenses 110 and 112 of the zoom optical system. Alternatively, the degree of expansion of the lens barrel 20 may be changed by a motor 120 to change the relative positions of the lenses 110 and 112 of the zoom optical system, thereby changing the focal length.

As described above, the lens barrel 20 and the fixed lens barrel 102 form a nested structure. In the housed state, as shown in FIG. 5, the distances between the group of zoom lens elements 110, the shutter 56 and the group of focus lens elements 112 are reduced. In this state, the entrance window 104 is completely housed in the camera case 12 and is protected from dirt or damage without any special barrier.

Figure 6:
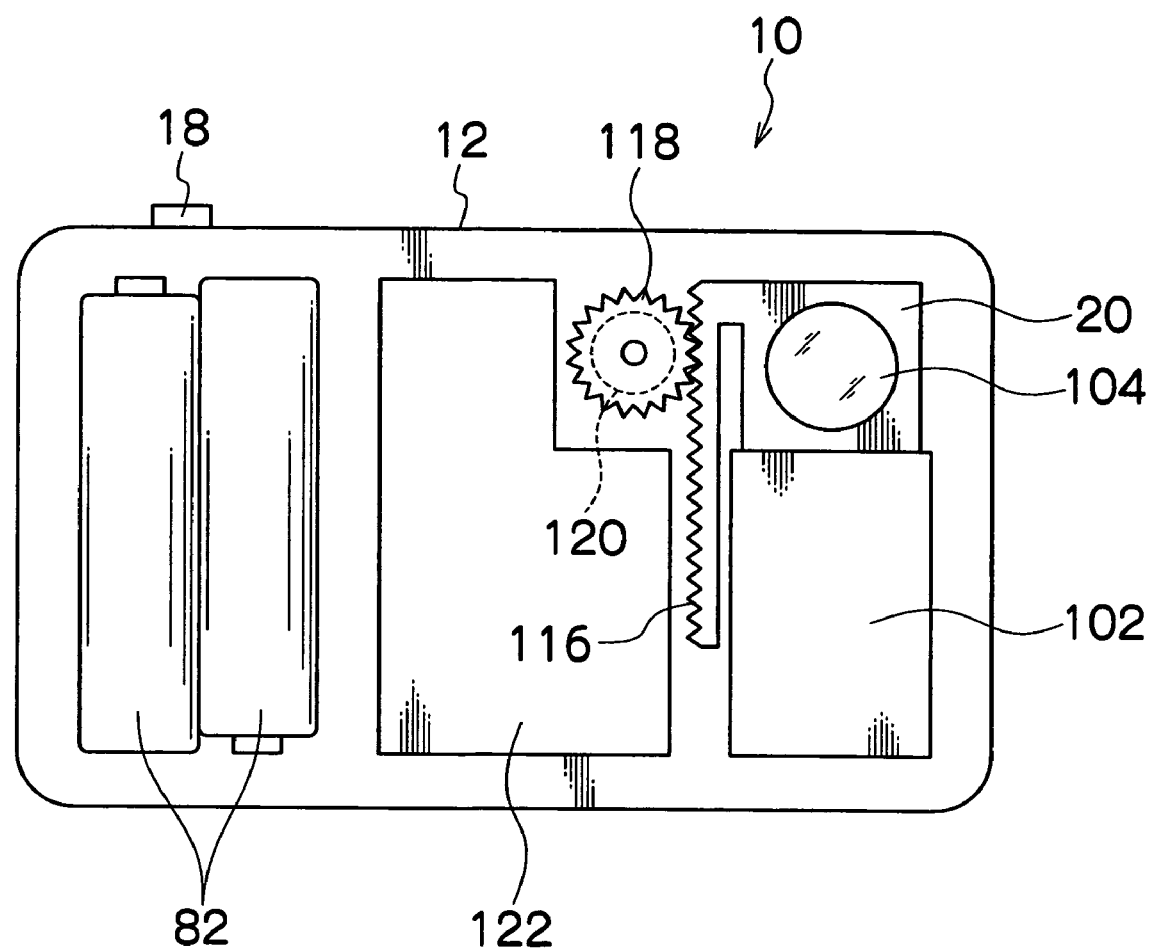
FIG. 6 is a schematic perspective view of the digital camera shown in FIG. 1 not in use.
Figure 7:
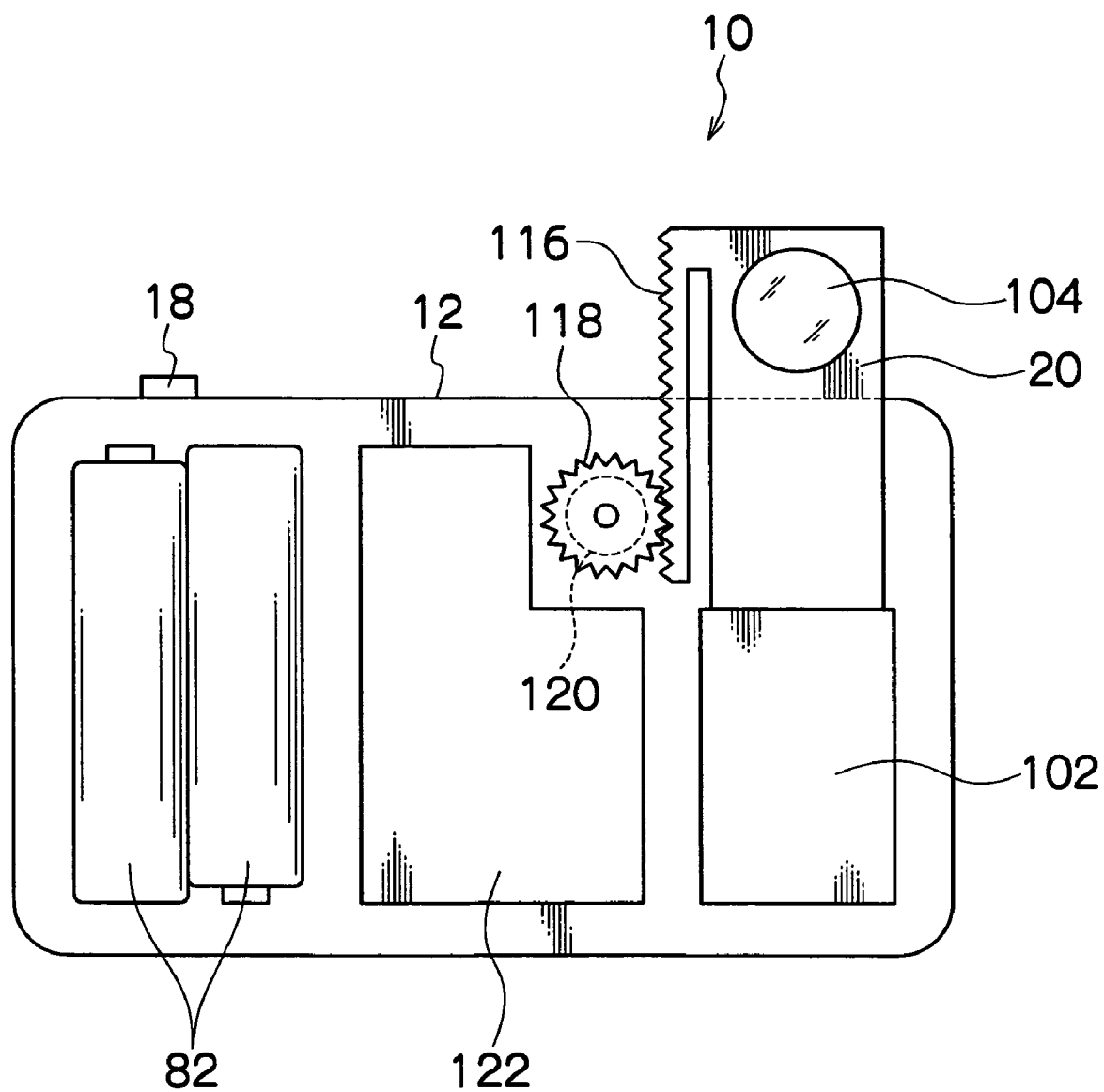
FIG. 7 is a schematic perspective view of the digital camera shown in FIG. 1 in use.

The nested lens barrel 20 has a vertical rack 116 on a side thereof, as shown in the schematic diagrams of FIGS. 6 and 7. The rack 116 engages with a pinion 118, and the mechanical power is transferred from the motor 120 to the pinion 118 through a reduction gear (not shown). Thus, in the state shown in FIG. 6 (the housed state: the not-in-use position), if the pinion 118 rotates counterclockwise, the lens barrel 20 is expanded upward, and the entrance window 104 protrudes from the upper surface of the camera case 12 and is located at the in-use position as shown in FIG. 7, so that picture taking is enabled. With the optical system in this state, the group of zoom lens elements 110, the shutter 56 and the group of focus lens elements 112 are spaced apart from each other by distances required for the image formation, as shown in FIG. 4. On the other hand, in the state shown in FIG. 7 (the contracted state: the in-use position), if the pinion 118 rotates clockwise, the lens barrel 20 is contracted downward, and the entrance window 104 is housed in the camera case 12, and is located in the not-in-use position as shown in FIG. 6, so that picture taking is disabled. With the optical system in this state, the distances between the group of zoom lens elements 110, the shutter 56 and the group of focus lens elements 112 are reduced as shown in FIG. 5. In FIGS. 6 and 7, reference numeral 122 designates a camera substrate incorporated in the camera case 12, and electronic components, such as the CPU 36 shown in FIG. 3, are mounted on the camera substrate 122.

Thus, in the digital camera 10 configured as described above, only the lens barrel 20 having the entrance window 104 and the refractive optical system 106 can be expanded and contracted, and the camera case 12 cannot be expanded and contracted. Thus, compared with the digital camera described in the patent literature 2, in which both the camera case 12 and the lens barrel 20 can be expanded and contracted, the structure can be simplified.

In addition, the entrance window 104 is located at the in-use position (see FIG. 7) where the entrance window 104 protrudes from the upper surface of the camera case 12 when the lens barrel 20 is expanded, and is located at the not-in-use position (see FIG. 6) where the entrance window is housed in the camera case 12 when the lens barrel 20 is contracted. Thus, compared with the digital camera described in the patent literature 1, in which the entire optical system is housed in the camera case even when the camera is in use, the total height of the camera case 12 can be reduced, so that the size of the camera can be reduced.

Furthermore, since the entrance window 104 is housed in the camera case 12 when the camera is not in use, any barrier is not needed. Thus, compared with the digital camera having a barrier described in the patent literature 1, the structure can be simplified because the barrier open/close mechanism is not needed.

The digital camera 10 shown in FIGS. 1 to 7 is configured so that the lens barrel 20 can be expanded and contracted in the height direction of the camera case 12. However, the present invention is not limited thereto, and as shown in FIGS. 8 and 9, the lens barrel 20 may be expanded and contracted in the horizontal direction of the camera case 12, and the entrance window 104 may protrude outward from the side surface of the camera case 12.

Figure 8:
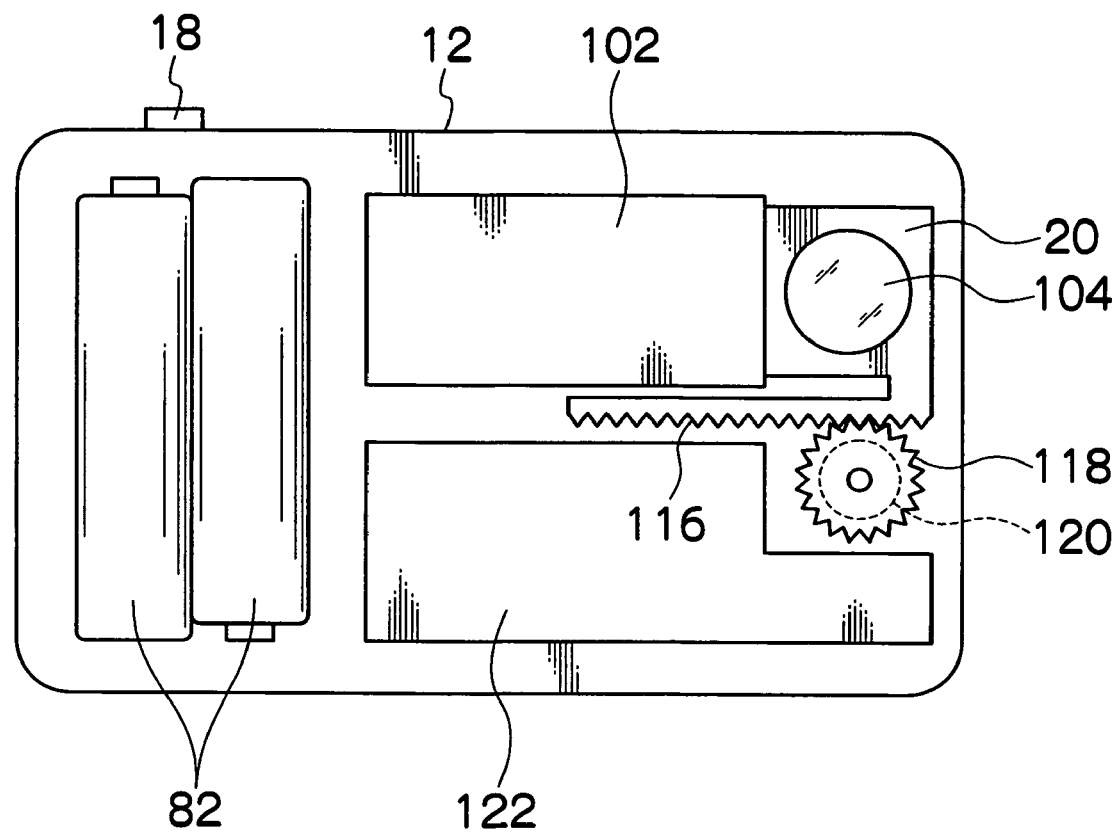
FIG. 8 is a diagram showing an embodiment (when not in use) in which an entrance window protrudes from a side of a camera case.
Figure 9:
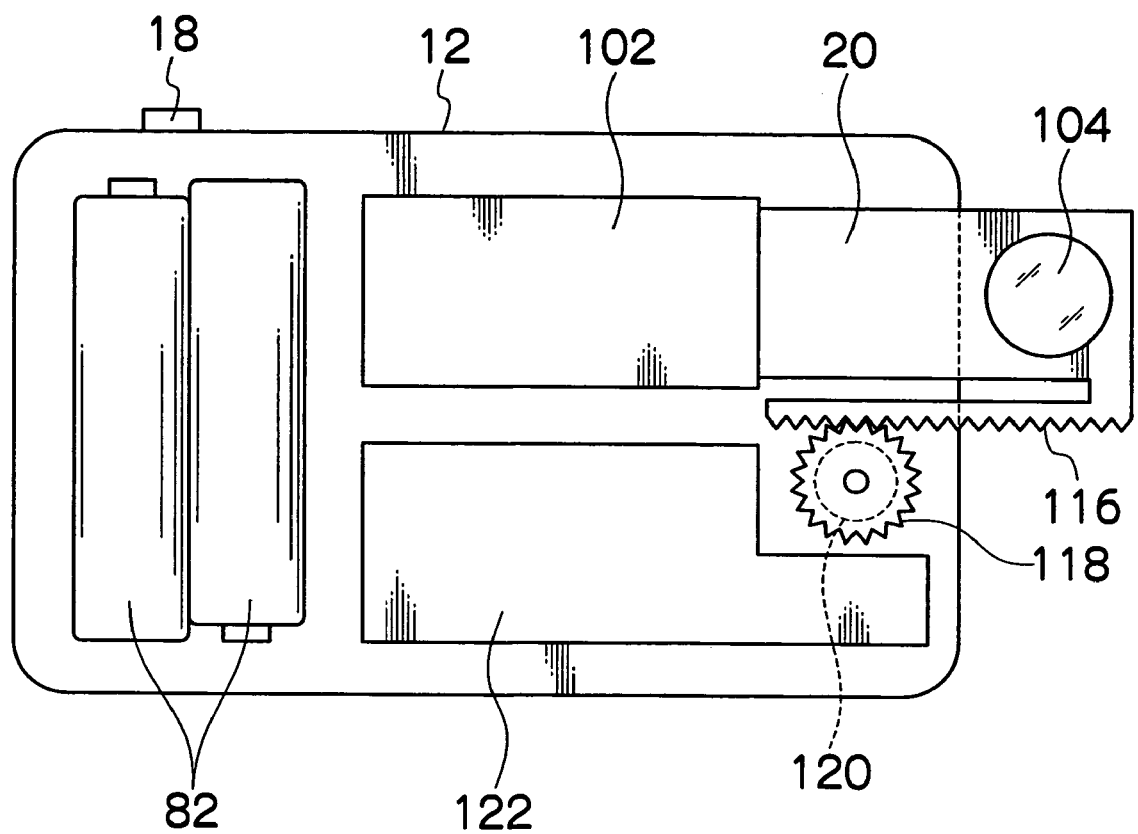
FIG. 9 is a diagram showing the same embodiment (when in use) of FIG. 8 in which an entrance window protrudes from a side of a camera case.

In the housed state, as shown in FIG. 8, the entrance window 104 is housed in the camera case 12 and protected from dirt or damage without any special barrier. In the state shown in FIG. 8, if the motor 120 rotates clockwise, the lens barrel 20 is expanded rightward, and the entrance window 104 protrudes outward from the right surface of the camera case 12 as shown in FIG. 9. Thus, picture taking is enabled. In the optical system in this state, the group of zoom lens elements 110, the shutter 56 and the group of focus lens elements 112 are spaced apart from each other by distances required for the image formation, as in the case shown in FIG. 5. According to this embodiment, not only the horizontal dimension of the camera case 12 can be reduced, but also the digital camera can have improved gripping characteristics and higher layout flexibility.

Figure 10:
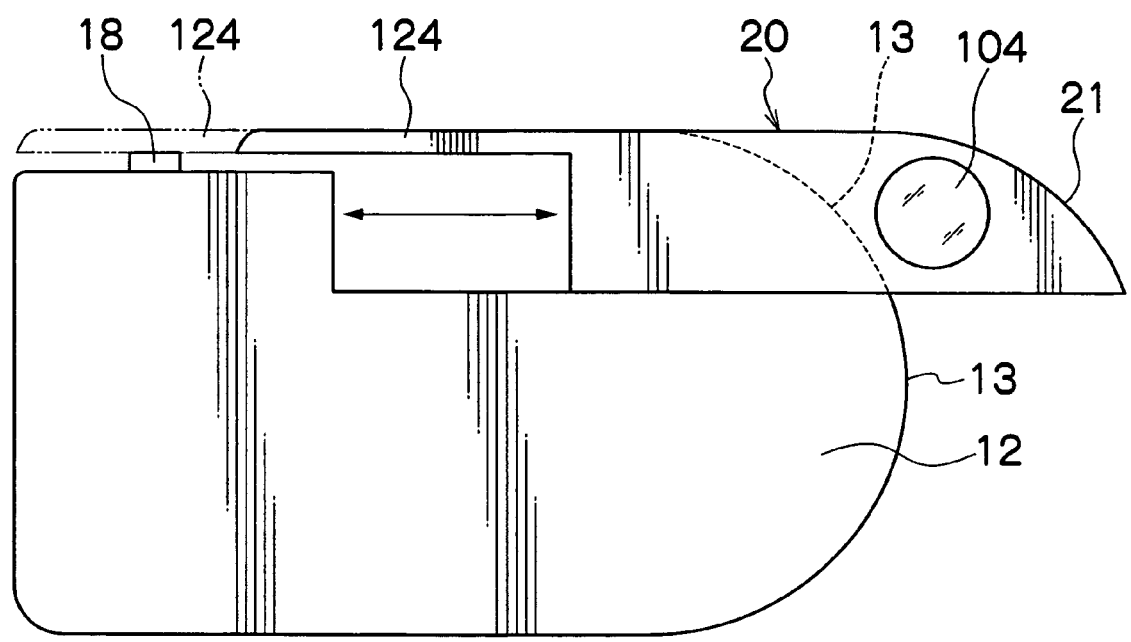
FIG. 10 is a diagram showing another embodiment in which an entrance window protrudes from a side of a camera case.
Figure 11:
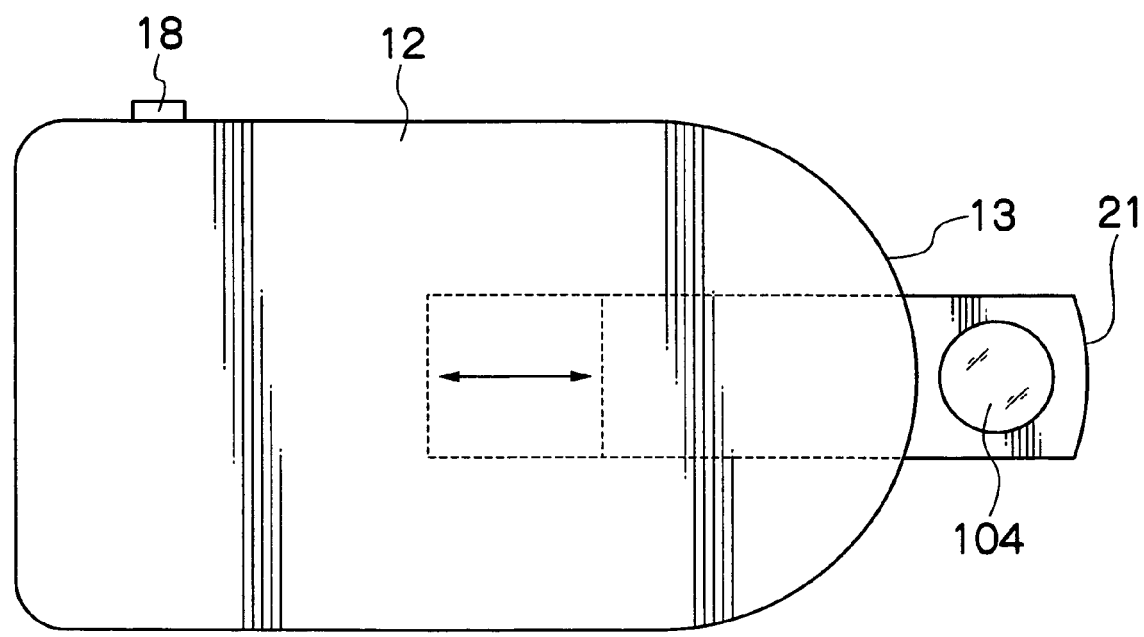
FIG. 11 is a diagram showing another embodiment in which an entrance window protrudes from a side of a camera case.

FIGS. 10 and 11 show other embodiments in which the entrance window 104 protrudes outward from the right surface of the camera case 12. The camera case 12 shown in these drawings has a curved right surface 13 of an excellent design. An end face 21 of the lens barrel 20 has a curved shape so that it is flush with the right surface 13 when the lens barrel is contracted (when the camera is not in use). According to the embodiment shown in FIG. 11, the entrance window 104 protrudes from and is retracted into the camera case 12 substantially at the center of the right surface 13, and according to the embodiment shown in FIG. 10, the entrance window 104 protrudes from and is retracted into the camera case 12 at an upper part of the right surface 13. The lens barrel 20 shown in FIG. 10 has, at the left end thereof, an integrally formed plate 124 that covers the picture taking button 18 when the entrance window 104 is housed.

Figure 12:
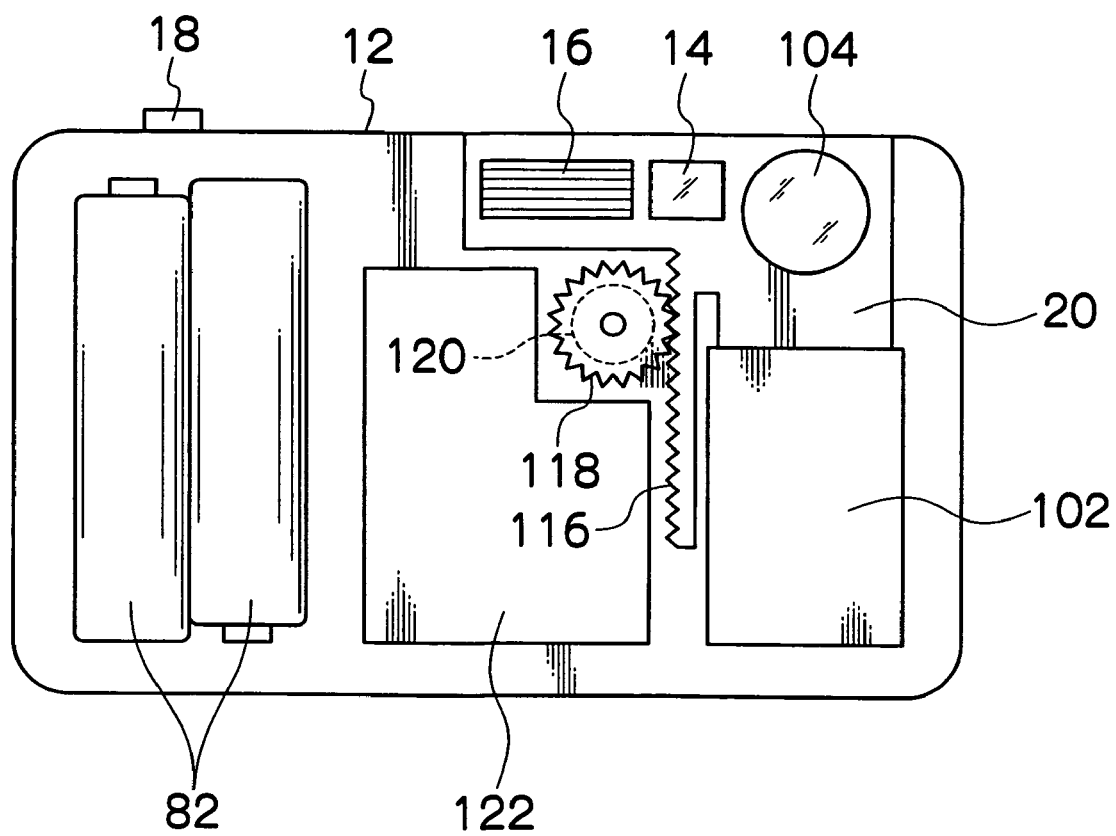
FIG. 12 is a diagram showing another embodiment in which an entrance window, an optical finder and a stroboscopic light-emitting part are mounted on a lens barrel.
Figure 13:
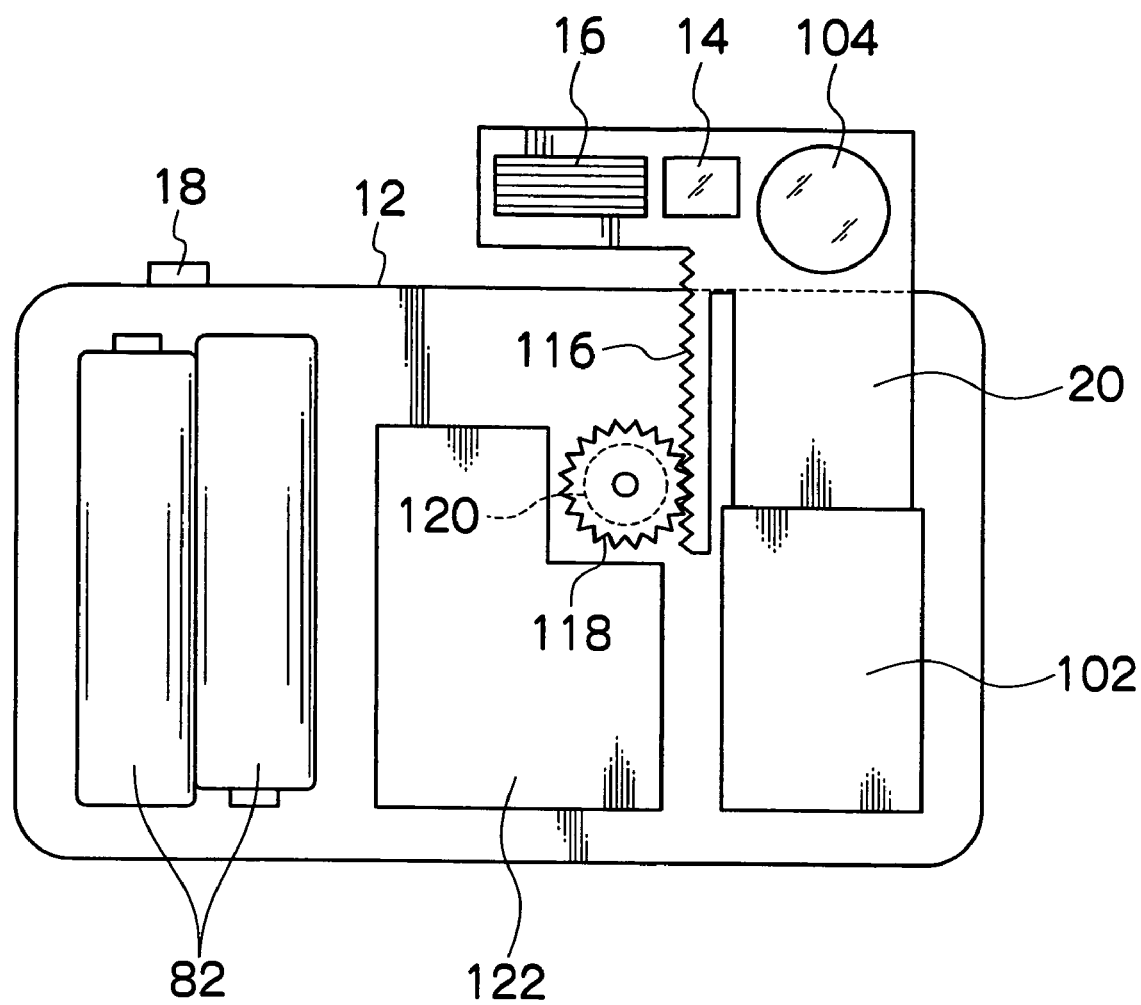
FIG. 13 is a diagram showing the another embodiment in which an entrance window, an optical finder and a stroboscopic light-emitting part are mounted on a lens barrel.

FIGS. 12 and 13 show a digital camera in which the entrance window 104, the optical finder 14 and the stroboscopic light-emitting part 16 are mounted on the lens barrel 20, and the optical finder 14 and the stroboscopic light-emitting part 16 can be housed along with the entrance window 104 (see FIG. 12). In the housed state (when not in use) shown in FIG. 12, this digital camera has a full flat front surface because picture taking components exposed on the front surface of the camera case 12 are hidden. Thus, viewed from outside, the camera case 12 has a substantially capsule-like shape, so that any case for protecting the entrance window 104, the optical finder 14 and the stroboscopic light-emitting part 16 during carriage is not needed. On the other hand, when taking a picture (or when in use), as shown in FIG. 13, the optical finder 14 and the stroboscopic light-emitting part 16 protrude from the upper surface of the camera case 12. Thus, the camera function becomes available, while maintaining a smart appearance.

In addition, since the optical finder 14 and the stroboscopic light-emitting part 16 are housed in the camera case along with the entrance window 104, the optical finder 14 and the stroboscopic light-emitting part 16 can also be protected.

An example in which both the optical finder 14 and the stroboscopic light-emitting part 16 are mounted on the lens barrel 20 having the entrance window 104 has been described with reference to FIGS. 12 and 13. However, the present invention is not limited thereto, and at least one of the optical finder 14 and the stroboscopic light-emitting part 16 may be mounted on the lens barrel 20.

What is claimed is:

1. An image capturing device, comprising:
   an image capturing device body;
   a lens barrel having an entrance window and a refractive optical system that bends subject light incident from the entrance window to form an image thereof on an imaging element, the lens barrel being housed in the image capturing device body in such a manner that the lens barrel is capable of protruding from and retracting into the image capturing device body;
   an image taking button disposed on the image capturing device body; and
   a plate which is integrally formed on the lens barrel and covers the image taking button when the lens barrel is housed in the image capturing device body,
   wherein the lens barrel is capable of being expanded and contracted along an optical axis extending toward the imaging element, the entrance window is located at an in-use position where the entrance window protrudes from the image capturing device body when the lens barrel is expanded, and the entrance window is located at a not-in-use position where the entrance window is housed in the image capturing device body when the lens barrel is contracted,
   an optical axis of the entrance window is substantially perpendicular to the optical axis along which the lens barrel and the entrance window move when the lens barrel is expanded and contracted, and
   the entrance window faces the same direction as a front face of the image capturing device body.

2. The image capturing device according to claim 1, wherein the entrance window protrudes outward from an upper surface or side surface of the image capturing device body when the lens barrel is expanded.

3. The image capturing device according to claim 1, wherein, when the lens barrel is expanded, a zoom lens disposed in the lens barrel moves along the optical axis to change the focal length.

4. The image capturing device according to claim 2, wherein, when the lens barrel is expanded, a zoom lens disposed in the lens barrel moves along the optical axis that extends toward the imaging element to change the focal length.

5. The image capturing device according to claim 1, wherein the entrance window has an integrally formed optical finder, and the optical finder is moved along with the entrance window between the in-use position and the not-in-use position.

6. The image capturing device according to claim 2, wherein the entrance window has an integrally formed optical finder, and the optical finder is moved along with the entrance window between the in-use position and the not-in-use position.

7. The image capturing device according to claim 3, wherein the entrance window has an integrally formed optical finder, and the optical finder is moved along with the entrance window between the in-use position and the not-in-use position.

8. The image capturing device according to claim 4, wherein the entrance window has an integrally formed optical finder, and the optical finder is moved along with the entrance window between the in-use position and the not-in-use position.

9. The image capturing device according to claim 1, wherein the entrance window has an integrally formed stroboscopic light-emitting part, and the stroboscopic light-emitting part is moved along with the entrance window between the in-use position and the not-in-use position.

10. The image capturing device according to claim 2, wherein the entrance window has an integrally formed stroboscopic light-emitting part, and the stroboscopic light-emitting part is moved along with the entrance window between the in-use position and the not-in-use position.

11. The image capturing device according to claim 3, wherein the entrance window has an integrally formed stroboscopic light-emitting part, and the stroboscopic light-emitting part is moved along with the entrance window between the in-use position and the not-in-use position.

12. The image capturing device according to claim 4, wherein the entrance window has an integrally formed stroboscopic light-emitting part, and the stroboscopic light-emitting part is moved along with the entrance window between the in-use position and the not-in-use position.

13. The image capturing device according to claim 5, wherein the entrance window has an integrally formed stroboscopic light-emitting part, and the stroboscopic light-emitting part is moved along with the entrance window between the in-use position and the not-in-use position.

14. The image capturing device according to claim 6, wherein the entrance window has an integrally formed stroboscopic light-emitting part, and the stroboscopic light-emitting part is moved along with the entrance window between the in-use position and the not-in-use position.

15. The image capturing device according to claim 7, wherein the entrance window has an integrally formed stroboscopic light-emitting part, and the stroboscopic light-emitting part is moved along with the entrance window between the in-use position and the not-in-use position.

16. The image capturing device according to claim 8, wherein the entrance window has an integrally formed stroboscopic light-emitting part, and the stroboscopic light-emitting part is moved along with the entrance window between the in-use position and the not-in-use position.

17. The image capturing device according to claim 1, wherein the entrance window and the refractive optical system are capable of simultaneously moving along the optical axis that extends toward the imaging element.

18. The image capturing device according to claim 1, wherein the refractive optical system protrudes from the image capturing device body when the lens barrel is expanded, and the refractive optical system is housed in the image capturing device body when the lens barrel is contracted.

19. An image capturing device, comprising:
    an image capturing device body;

a lens barrel which is housed in the image capturing device body in such a manner that the lens barrel is capable of protruding from and retracting into the image capturing device body;

an entrance window which is comprised by the lens barrel, the entrance window being at an in-use position where the entrance window protrudes from the image capturing device body when the lens barrel is expanded, and the entrance window being at a not-in-use position where the entrance window is housed in the image capturing device body when the lens barrel is contracted;

an imaging element;

a refractive optical system which includes a prism for bending subject light incident from the entrance window to form an image thereof on the imaging element, the prism protruding from the image capturing device body when the lens barrel is expanded, and the prism being housed in the image capturing device body then the lens barrel is contracted;

an image taking button disposed on the image capturing device body; and a plate which is integrally formed on the lens barrel and covers the image taking button when the lens barrel is housed in the image capturing device body, wherein:

when the lens barrel is expanded and contracted, the lens barrel and the entrance window move along an optical axis which is substantially perpendicular to an optical axis of the entrance window, and a contraction of the lens barrel shortens a distance between the imaging element and the prism, and the entrance window faces the same direction as a front face of the image capturing device body.

* * * * *